United States Patent

Hartmann et al.

[15] 3,648,970
[45] Mar. 14, 1972

[54] HANDLE ASSMEBLY FOR A ROTATABLE BALL VALVE

[72] Inventors: Leonard Hartmann, Maplewood; Joseph Sciuto, Jr., Crestwood, both of Mo.

[73] Assignee: Stile-Craft Manufacturers, Inc., St. Louis, Mo.

[22] Filed: Feb. 27, 1970

[21] Appl. No.: 15,048

[52] U.S. Cl. .......................... 251/104, 251/297, 251/110, 137/385
[51] Int. Cl. ................................................ F16k 35/06
[58] Field of Search ................ 251/104, 110, 297, 315; 137/385, 553

[56] References Cited

UNITED STATES PATENTS

| | | | |
|---|---|---|---|
| 955,611 | 4/1910 | Stevens | 251/110 X |
| 1,517,804 | 12/1924 | Shultz | 251/110 X |
| 1,810,547 | 6/1931 | Woods | 251/110 X |
| 2,034,216 | 3/1936 | Stout et al | 251/110 X |
| 3,228,415 | 1/1966 | Geiss | 137/385 |
| 3,348,805 | 10/1967 | Sanctuary | 251/315 |
| 3,495,621 | 2/1970 | Verbrugge | 137/553 |
| 943,838 | 12/1909 | Miller | 251/297 X |
| 2,081,464 | 5/1937 | Stewart | 251/297 X |

*Primary Examiner*—Henry T. Klinksiek
*Attorney*—Cohn and Powell

[57] ABSTRACT

The valve includes a housing and a rotatable closure element mounted within the housing. A handle, connected to the closure element by means of a rotatable shaft mounted to the housing, provides a means of rotating the closure element to selected flow positions. The handle assembly includes a notched latch plate, locked to the housing to provide a detent element, and a spring-loaded latch pin, movably mounted to the handle. The latch pin is engageable with selected notches to latch the handle in specific positions corresponding to desired flow paths through the valve. Stop abutments on the latch plate are engageable by the handle to confine rotation of the handle to within predetermined limits.

6 Claims, 4 Drawing Figures

PATENTED MAR 14 1972 3,648,970

INVENTORS
LEONARD HARTMANN
JOSEPH SCIUTO, JR.
BY
Cohn and Powell
ATTORNEYS

HANDLE ASSEMBLY FOR A ROTATABLE BALL VALVE

BACKGROUND OF THE INVENTION

This invention relates in general to a rotatable valve control assembly and in particular to a handle assembly permitting the valve to be latched into selected, indicated positions.

Rotatable valves, and especially ball valves are frequently used in situations where rapid, efficient cut-off or flow diversion are required in hydraulic systems.

It is important that the operator of such rotatable valves be aware of the flow conditions within the valve and in this regard, it is necessary to be aware of the disposition of the internal, movable elements. To this end, ball valves, for example, usually include marker points which, when aligned, indicate the disposition of closure parts and hence the flow condition through the valve. In some instances, an elongate handle which is used to operate the valve, is also utilized as a pointer. However, this arrangement has several disadvantages. For example, unless the handle is quite stiff in its operation, it tends to be susceptible to random movement and may easily be inadvertently actuated. On the other hand, if the handle movement is too stiff, it becomes difficult to operate the valve, and thus, this solution is quite unsatisfactory.

Latching devices, capable of maintaining the closure parts in selected positions, probably provide the best approach to the solution of the problem. However no known successful means of latching an elongate handle in a selected position appears in the prior art.

SUMMARY OF THE INVENTION

The handle assembly of this rotatable valve provides a simple means of actuating the closure mechanism and at the same time, indicating the precise, internal flow conditions of the valve. By means of an external latched mechanism, an elongate handle connected to the rotatable closure element of the valve may be locked in a selected position in which it is not susceptible to inadvertent movement. This valve handle assembly is particularly useful in combination with a ball valve having an external housing and an internal, rotatable ball closure element.

Essentially, the housing includes an aperture which rotatively mounts a shaft attached to the elongate handle. The shaft operatively engages the closure element within the housing, whereby to turn the closure element and the shaft is itself turned by means of the handle, which is detachably attached to the shaft.

A first latch element is detachedly mounted on the housing, said latch element including an aperture receiving the shaft and including also a detent portion which is provided by a notched margin. Stop means between the housing and the first latch element selectively preclude relative rotation of the first latch element.

A second latch element, selectively engageable with the detent portion of the first latch element, is movably mounted on the handle. Engagement of the two latch elements serves to align the handle, and therefore the closure element, in a predetermined position relative to the valve housing.

The second latch element includes a spring-loaded pin having an enlarged end latchingly engageable with compatibly shaped notches on the first latch element. The pin is digitally depressible to an unlatched position and includes a relatively narrow shank which is sufficiently spaced from the first latch element as to be clear of said element at all times. Thus, when the pin is digitally depressed and the enlarged pin end is thereby disengaged from the first latch element, the handle may be rotated to a new position within defined limits.

The housing includes a recessed portion concentrically disposed at the inner end of the housing aperture and providing an abutment. The shaft includes a collar providing a shoulder engageable with the recess abutment and thereby precluding outward movement of the shaft relative to the housing.

DESCRIPTION OF THE PREFERRED EMBODIMENT

Figures 1, 2, 3, 4:
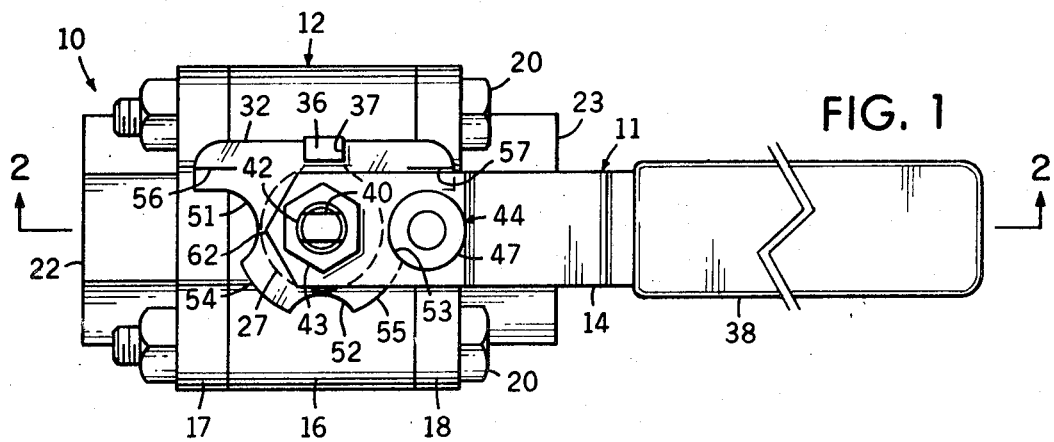
FIG. 1 is a plan view of the valve in an open flow position.
FIG. 2 is a sectional elevational view taken on line 2—2 of FIG. 1.
FIG. 3 is an end elevational view taken on line 3—3 of FIG. 2.
FIG. 4 is a perspective view of the handle shaft and rotatable ball.

Referring now by characters of reference to the drawing, and first to FIGS. 1 and 2, it will be understood that the rotatable valve, with which the handle assembly is used in the preferred embodiment, is a ball valve 10.

The handle assembly, generally indicated by numeral 11, is mounted to the valve housing 12 by means of a shaft 13 connected to an elongate handle 14. The shaft 13 is engageable with the valve closure element, said element being provided by a rotatable ball 15. The handle assembly 11 incorporates a latching mechanism which permits the handle 14, and therefore the ball 15, to be rotated to selected closure positions and locked in place.

In the preferred embodiment, the housing 12 is in three parts consisting of an intermediate portion 16 and end portions 17 and 18 which flank the intermediate portion 16 and are detachably attached thereto by fasteners 20 extending between all three housing portions.

As shown in FIG. 2, the rotatable ball 15 includes a right-angular passage 21, which is capable of diverting flow from either of the inlet ports 22 and 23 through an outlet port 24. In the drawing, the handle 14 and the ball 15 are so oriented that flow, as indicated by the arrows, is diverted from the inlet port 22 to the outlet port 24. By rotating the handle 14 through 180°, flow through the inlet port 22 is cut off and fluid may be diverted from inlet port 23 to outlet port 24. It will be understood that if required, fluid flow may enter port 24 and be diverted through either of ports 22 or 23. The size of the right angular passage 21 which passes through the ball 15 is such that when the handle 14 is located in a perpendicular position, all of the ports 22, 23 and 24 are effectively closed by the surface of the ball 15. In this situation, the valve is completely cut off and there is no fluid flow therethrough. A pair of washers 25 of TEFLON, or other suitable material, provides a seal between the rotatable ball 15 and the housing 12. Conventional O-rings 26 provide a seal between the intermediate and end portions of the housing.

The housing 12 includes a hub 27 having an aperture 28 extending therethrough and the shaft 13 is relatively received within said aperture 28. A pair of O-rings 30 provide a seal between the shaft 13 and the housing aperture 28, grooves 31 being provided around the shaft 13 to accommodate said O-rings 30.

As shown in FIG. 4, the handle assembly shaft 13 includes an arcuately configured plug 29 which is engageable within a compatibly configured socket 39 provided within the rotatable ball 15. The plug 29 and socket 39 provide, respectively, engaging shoulder and abutment portions by means of which the shaft 13 rotates the ball 15.

The handle assembly 11 includes a latch plate 32 constituting a first latch element having an aperture 33 receiving the shaft 13 in rotative relation. The shaft 13 includes a peripheral seating seating abutment 34 which is raised slightly above the housing hub 27 in the assembled position, as shown in FIG. 2, to engage the lower margin 35 of the latch plate aperture 33. The latch plate 32 is precluded from rotation relative to the housing 12 by interengaging tongue and groove means provided by a rectangular lug 36, which is preferably integrally cast with the housing 12, and a compatible U-shaped slot 37 provided in the latch plate 32. The lug 36 is spaced from the center of rotation of the shaft 13 and it will be understood that rotation of the latch plate 32 is precluded by couple resistance resulting from this lug spacing. Once installed, the latch plate 32 acts effectively as though it were part of the housing 12.

The handle 14 is cranked and is provided with a handgrip portion 38. The handle 14 is detachably connected to the shaft 13 in such a manner that, when assembled, the handle 14 and the shaft 13 form essentially a single rotatable unit. This connection is accomplished by providing the handle 14 with a noncircular aperture 40 which receives a compatibly shaped portion of the shaft 13. In the preferred embodiment, this is achieved, as shown in FIG. 4, by providing opposed flats 41 on an outwardly extending threaded portion 42 of the shaft 13, said portion 42 being received within the noncircular aperture 40. The threaded portion 42 is provided with a retaining nut 43 which holds the handle 14 in place.

A spring-loaded, depressible pin, generally shown by numeral 44 and constituting a second latch element, is transversely mounted in movable relation to the handle 14. The pin 44 includes a shank 45 having an enlarged head 46 integral with the shank 45 at one end. A cap 47 is attached to the shank 45 at the other end of the pin 44. A compression spring 48 is mounted between the underside of the cap 47 and the upper face of the handle 14. The shank 45 is slidably received within an aperture 50 provided in the handle 14 and this arrangement permits the pin 44 to be digitally depressed within limits defined by the spacing of the cap 47 from the handle 14. This spacing is at least equal to the thickness of the latch plate 32 to permit the pin head 46 to be depressed below said latch plate 32.

As shown clearly in FIG. 1, the latch plate 32 includes a plurality of peripheral notches 51, 52 and 53 constituting a detent portion. The notches 51, 52 and 53 have a radius slightly larger than the radius of the pin head 46 and are latchingly engageable with said pin head 46. In the preferred embodiment, the arcuate notches 51, 52 and 53 are marginally spaced at 90° intervals about the latch plate 32. The latch pin 44 is sufficiently spaced from the center of rotation of the shaft 13 so that when the pin 44 is depressed, the shank 45 is clear of the intermediate margin portions 54 and 55, which extend between the notches 51, 52 and 53. It will be understood that the diameter of the pin head 46 is sufficiently small to clear the housing hub 27. Thus, when the spring-loaded pin 44 is depressed out of latched engagement with an arcuate notch, for example notch 53, the handle 14, and therefore the shaft 13, may be rotated to another selected, latched position and the spring-loaded pin 44 may be released for upward movement into latched engagement with another arcuate notch. The latch plate 32 includes a pair of raised, abutment portions 56 and 57 which are engageable by the handle 14 to confine the rotation of said handle 14 to a semicircular arc.

The shaft 13, which is rotatively mounted within the housing aperture 28, is retained within said aperture 28 by means of a retaining collar 60 provided at the lower end of the shaft 13. The housing aperture 28 includes a compatible recess 61 receiving said retaining collar 60, the recess 61 constituting an abutment engaging the shoulder provided by the retaining collar 60. The shaft 13 is thereby precluded from outward movement relative to the housing 12.

It is thought that the structural features and functional advantages of this ball valve and handle assembly have become fully apparent from the foregoing description of parts, but for completeness of disclosure, the installation and operation of the device will be briefly described.

The assembly of the valve 10 is commenced by installing the shaft 13 into the housing aperture 28 from the interior of the housing 12. In order to install the ball 15, the shaft 13 must be oriented at 90° to the position shown in FIG. 2 of the drawing because of the nature of the interengagement between the arcuate plug 29 and the arcuate socket 39 of the ball 15. When the shaft 13 is properly aligned, the ball 15 may be easily rolled into position and, following installation of the sealing washers 25, the end portions 17 and 18 of the housing 12 may be secured to the intermediate portion 16 by fasteners 20. When sealingly mounted within the interior of the housing 12, the ball 15 is conditioned for rotation.

The latch pin 44 is mounted to the handle 14 by inserting the shank 45 through the handle aperture 50; then placing the compression spring 48 about the shank 45 and then attaching the end cap 47. When this assembly is completed, the pin 44 is mounted in spring-loaded, movable relation to the handle 14. The latch plate 32, which is an independent element, is oriented relative to the housing 12 so that the U-shaped slot 37 is in register with the housing lug 36. The latch plate 32 may then be slipped into place over the shaft 13. Finally, the noncircular aperture 40 in the handle 14 is aligned with the flats 41 of the rotatable shaft threaded portion 42 and the handle 14 and shaft 13 are fastened together by means of the nut 43.

Before the handle 14 can be rotated, the spring-loaded pin 44 must be depressed so that the enlarged head 46 is disengaged from the notch 53 of the latch plate 32. When the pin 44 is depressed, the handle 14 may be rotated to any desired position. Following rotation, the handle 14 may be latched into specific positions by releasing the spring-loaded pin 44, when said pin is adjacent one of the other notches 51 or 52.

The handle 14 is so mounted that it provides, in effect, a flow indicator. For example, in the position indicated in FIG. 1, the handle is disposed over the closed port 23 and the forward tip 62 of the handle 14 points to the port 22 through which flow is being received. On turning the handle 14 through 180°, the tip 62 indicates that flow is being received through port 23. When the handle 14 is midway between these two positions, and the spring-loaded pin 44 latched into the arcuate notch 52, both of the ports 22 and 23 are closed.

By virtue of the stop means provided by interengagement of the housing lug 36 within the slot 37, the latch plate 32 bears a substantially fixed relation to the housing 12. The limit abutments 56 and 57, provided on said latch plate 32 restrict rotation of the handle 14 to a 180° arc.

The effectiveness of the latching mechanism is enhanced by the fact that the latch pin 44 is spaced from the center of rotation of the shaft 13. By virtue of this spacing, the latch pin 44 and the shaft 13 cooperate to provide a couple resisting turning of the handle 14 when the latch pin 44 is in the latched condition.

We claim as our invention:

1. In a rotatable valve:
   a. a housing including a rotatable closure element,
   b. a first latch element including a detent portion,
   c. a shaft rotatively mounted to the housing and operatively connected to the closure element to turn said closure element,
   d. a handle detachably connected to the shaft,
   e. a second latch element mounted in movable relation to the handle, said second latch element being selectively engageable with the detent portion of the first latch element whereby to align the closure element in a predetermined position,
   f. the first latch element is detachable from the housing,
   g. stop means between the first latch element and the housing precludes relative rotation thereof,
   h. the shaft including an abutment seating portion, and
   i. the first latch element including an aperture receiving the shaft whereby the first latch element is seated on said abutment seating portion.

2. In a rotatable valve:
   a. a housing including a rotatable closure element, and an aperture,
   b. a shaft rotatively mounted in the housing aperture and operatively engaging the closure element in turning relation,
   c. a first latch element including an aperture receiving the shaft and including a detent portion,
   d. stop means between the housing and the first latch element selectively precluding relative rotation thereof,
   e. a handle detachably connected to the shaft,
   f. a second latch element mounted in movable relation to the handle, the second latch element being selectively engageable with the detent portion of the first latch element whereby to align the closure element in a predetermined position,
g. the first latch element including a margin having at least one notch providing the detent portion, and
h. the second latch element including a pin mounted on the handle for movement substantially parallel to the shaft, and having an enlarged end latchingly engageable with the notch, the pin being accessible for digital actuation to disengage the enlarged pin end from the notch.

3. In a rotatable valve:
a. a housing including a rotatable closure element, and an aperture,
b. a shaft rotatively mounted in the housing aperture and operatively engaging the closure element in turning relation,
c. a first latch element including an aperture receiving the shaft and including a detent portion,
d. stop means between the housing and the first latch element selectively precluding relative rotation thereof,
e. a handle detachably connected to the shaft,
f. a second latch element mounted in movable relation to the handle, the second latch element being selectively engageable with the detent portion of the first latch element whereby to align the closure element in a predetermined position,
g. the first latch element being detachable and including a margin having a plurality of spaced notches, each notch providing a detent,
h. the second latch element including a pin resiliently mounted on the handle for transverse movement relative to the handle substantially parallel to the shaft, the pin having an enlarged end latchingly and selectively engageable with each of the notches, and
i. the stop means includes interfitting tongue and groove elements, one of said elements being disposed on the housing and the other of said elements being disposed on the first latch element.

4. In a rotatable valve:
a. a housing including a rotatable closure element, and an aperture,
b. a shaft rotatively mounted in the housing aperture and operatively engaging the closure element in turning relation,
c. a first latch element including an aperture receiving the shaft and including a detent portion,
d. stop means between the housing and the first latch element selectively precluding relative rotation thereof,
e. a handle detachably connected to the shaft,
f. a second latch element mounted in movable relation to the handle, the second latch element being selectively engageable with the detent portion of the first latch element whereby to align the closure element in a predetermined position,
g. the housing including:
　1. a lug providing a tongue,
　2. a recess concentrically disposed inwardly of the aperture and providing an abutment,
h. the first latch element being detachable from the housing and including:
　1. a margin having a plurality of spaced notches, each notch providing a detent,
　2. a slot engageable by the housing lug to provide the stop means precluding rotation of the first latch element relative to the housing,
　3. an aperture receiving the shaft in rotatable relation,
　4. a limit lug engageable by the handle, and selectively limiting rotation thereof, and
i. the shaft including:
　1. a collar providing a shoulder engageable with the recess abutment of the housing and precluding outward movement of the shaft relative to the housing,
　2. an abutment seating portion seating the first latch element, and
j. second latch element including a pin resiliently mounted on the handle for transverse movement relative to the handle substantially parallel to the shaft, the pin including:
　1. a shank,
　2. opposed enlarged ends,
　3. a spring disposed on the shank between one of said enlarged ends, and the handle, and
　4. the other of said enlarged ends being latchingly and selectively engageable with each of the notches of the first latch element, and being digitally depressible to an unlatched position.

5. A handle assembly for a rotatable valve of the type including a housing having a rotatable ball mounted therewithin, the assembly comprising:
a. a shaft adapted to be rotatively mounted in the housing in engaging relation to the ball, the shaft being enlarged at one end to preclude outward movement of said shaft from the housing,
b. a latch plate including an aperture receiving the shaft in rotative relation, the latch plate including a plurality of notches,
c. an elongate handle detachably connected to the shaft outwardly of the latch plate for rotation with the shaft, and
d. a pin transversely disposed on the handle substantially parallel to the shaft and movably mounted in resilient relation thereto, the pin including a shank and an enlarged end, said end being selectively engageable with each of the notches whereby to align the handle in a predetermined position, the shank being clear of the latch plate when the pin is digitally depressed and the enlarged end being selectively engageable with one of the notches when digital pressure is removed.

6. A handle assembly for a rotatable valve of the type including a housing having a rotatable closure element mounted therein, the assembly comprising:
a. a shaft adapted to be rotatively mounted in the housing in engaging relation to the closure element,
b. a latch plate including a plurality of side open notches,
c. an elongate handle connected to the shaft outwardly of the latch plate for rotating the shaft, and
d. a pin transversely disposed on the handle substantially parallel to the shaft and movably mounted in resilient relation thereto, the pin including a shank and an enlarged end, said enlarged end being selectively engageable with each of the notches whereby to align the handle in a predetermined position, the pin shank being clear of the latch plate and the enlarged pin end being disengaged from the notches when the pin is digitally depressed, and the enlarged pin end being selectively engageable with one of the notches when digital pressure is removed.

* * * * *